E. M. HOOVER.
LATHE CENTER.
APPLICATION FILED SEPT. 10, 1917.
1,338,451.
Patented Apr. 27, 1920.
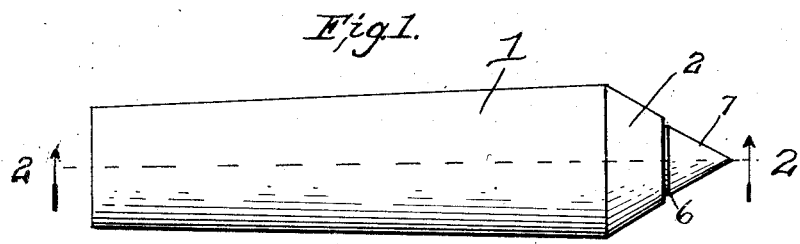
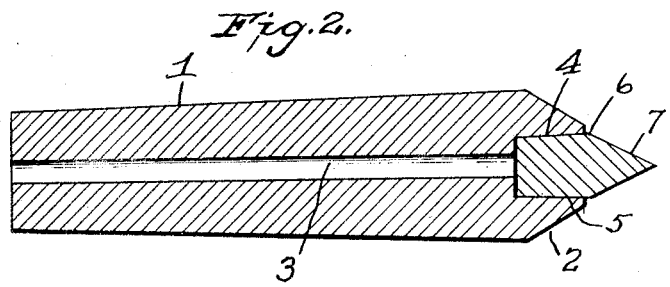
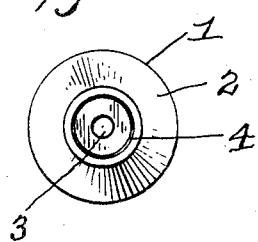
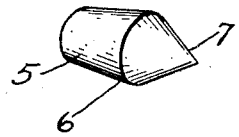
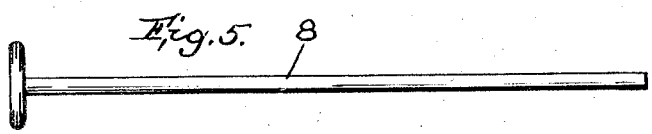
Inventor
Edward M. Hoover.
By
Lockwood & Lockwood
Attorneys

UNITED STATES PATENT OFFICE.

EDWARD M. HOOVER, OF ANDERSON, INDIANA, ASSIGNOR TO THE HOOVER MANUFACTURING COMPANY, OF ANDERSON, INDIANA, A CORPORATION.

LATHE-CENTER.

1,338,451.  Specification of Letters Patent.  Patented Apr. 27, 1920.

Application filed September 10, 1917. Serial No. 190,549.

*To all whom it may concern:*

Be it known that I, EDWARD M. HOOVER, a citizen of the United States, and a resident of Anderson, county of Madison, and State of Indiana, have invented a certain new and useful Lathe-Center; and I do hereby declare that the following is a full, clear, and exact description thereof, reference being had to the accompanying drawings, in which like letters refer to like parts.

My invention relates to new and useful improvements in lathe-centers for lathes, grinders or similar devices, and my object is to provide a removable centering point for use in connection with the lathe center.

A further object is to provide said removable point with a tapered portion for engagement with a tapered seat in the lathe center.

A further object is to provide an opening longitudinally of the lathe center, whereby an instrument may be introduced for disengaging the centering point from the lathe center.

Other objects and advantages will be hereinafter more fully set forth and pointed out in the accompanying specification.

In the accompanying drawings, which are made a part of this application, Figure 1 is a side elevation of the lathe center with the removable point attached thereto. Fig. 2 is a sectional view as seen on line 2—2 of Fig. 1. Fig. 3 is a front end elevation of the lathe center with the centering point removed therefrom. Fig. 4 is a perspective view of the centering point removed from the centering tool. Fig. 5 is a view of the rod for removing the centering point from the lathe center.

Referring to the drawings in which similar reference numerals designate corresponding parts throughout the several views, 1 indicates the lathe center which is preferably tapered from end to end, the forward or outer end of the center having a beveled face 2. Extending longitudinally of the lathe center 1 is a bore 3 which terminates at its forward end in an enlarged seat 4, the the walls of said seat being tapered to receive the tapered end 5 of a centering point, or pin 6, the projecting end 7 of the centering point being conical or pointed for engagement with the work or object to be centered in the lathe or grinder.

The object in providing the centering point 6 separate from the lathe center, is that in the form of lathe center as now used it is necessary to grind the beveled end thereof at intervals in order to keep the point properly sharpened for engagement with the work, which, in time, completely destroys the lathe center, while in the present instance the lathe center itself is never ground or otherwise treated, from the fact that when the centering point becomes blunt or worn it is removed and either sharpened or replaced by a new point, thus greatly reducing the expense of maintenance. It will also be seen that by tapering the centering point, as well as the walls of the lathe center, said point will be locked against rotation when properly engaged with the seat in the lathe center.

When the centering point has become dull or worn any suitable form of instrument, such as a plunger or bar 8, is introduced through the bore 3 and forced into engagement with the end of the centering point 6, thus releasing the centering point from the seat so it may be readily ground or replaced by a new point. The conical end 7 of the centering point and the beveled end 2 of the lathe center are so shaped that the work engaged by the centering point will never come in contact with the end of the lathe center, thus preventing wear on any part of the lathe center.

The invention claimed is:—

1. A centering device for lathes, grinders or like tools, comprising a centering tool having a longitudinal bore therethrough and a seat concentric with the bore at the forward end of the lathe center, the walls of which are tapered, of a centering point having one portion thereof tapered for engagement with the tapered seat of the centering tool, and the opposite end thereof conical to form a point for engagement with an object.

2. A centering device for lathes, grinders or like tools, comprising a tool having an inwardly tapering seat at the forward end of the lathe center, and a centering point having one portion thereof tapering rearwardly for engagement with the rearwardly tapering seat of the said tool, and the opposite end thereof conical for engagement with an object whereby said centering point will become wedged and secured in said seat upon application of said tool, the said tool being provided with means whereby the centering point may be forcibly removed therefrom.

In witness whereof I have hereunto affixed my signature.

EDWARD M. HOOVER.